(12) United States Patent
Drake

(10) Patent No.: US 9,455,878 B2
(45) Date of Patent: Sep. 27, 2016

(54) SYSTEMS AND METHODS FOR ENHANCED NETWORK IDENTIFICATION

(71) Applicant: General Electric Company, Schenectady, NY (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 287 days.

(21) Appl. No.: 14/181,801

(22) Filed: Feb. 17, 2014

(65) Prior Publication Data
US 2015/0236939 A1 Aug. 20, 2015

(51) Int. Cl.
*H04L 12/24* (2006.01)
*H04W 12/06* (2009.01)
*H04W 48/20* (2009.01)
*H04W 48/18* (2009.01)
*H04W 48/16* (2009.01)
*H04W 84/12* (2009.01)

(52) U.S. Cl.
CPC .............. *H04L 41/28* (2013.01); *H04W 12/06* (2013.01); *H04W 48/20* (2013.01); *H04W 48/16* (2013.01); *H04W 48/18* (2013.01); *H04W 84/12* (2013.01)

(58) Field of Classification Search
CPC ... H04W 48/02; H04W 48/16; H04W 48/18; H04W 84/12
See application file for complete search history.

(56) References Cited

U.S. PATENT DOCUMENTS

| 8,000,698 | B2 | 8/2011 | Wolman et al. |
| 8,131,291 | B2 | 3/2012 | Jeong et al. |
| 8,194,589 | B2 | 6/2012 | Wynn et al. |
| 8,411,640 | B2 | 4/2013 | Kuroda |
| 8,488,576 | B2 * | 7/2013 | Kezys .................... H04W 12/06 370/328 |
| 2006/0111097 | A1 | 5/2006 | Fujii |
| 2009/0235354 | A1 * | 9/2009 | Gray .................... H04L 63/1416 726/22 |
| 2010/0238860 | A1 * | 9/2010 | Ota ..................... H04W 64/003 370/328 |
| 2011/0208866 | A1 * | 8/2011 | Marmolejo-Meillon .............. H04L 63/0823 709/227 |
| 2013/0235859 | A1 | 9/2013 | Sun et al. |
| 2014/0045536 | A1 * | 2/2014 | Sydir .................... H04W 4/021 455/456.5 |
| 2014/0185597 | A1 * | 7/2014 | Gupta ................. H04L 63/0823 370/338 |
| 2015/0139025 | A1 * | 5/2015 | Lee ..................... H04W 76/021 370/254 |

FOREIGN PATENT DOCUMENTS

EP 2587849 A2 5/2013
EP 2158731 B1 7/2013

* cited by examiner

Primary Examiner — Jeong S Park
(74) Attorney, Agent, or Firm — Dority & Manning, P.A.

(57) ABSTRACT

Systems and methods for enhanced network identification are provided. One example method includes receiving, by a computing device, identification data for each of a plurality of networks. The identification data for each of the plurality of networks includes a service set identifier and a basic service set identifier. At least one of the plurality of networks is hosted by an appliance. The method includes comparing, by the computing device for each of the plurality of networks, the service set identifier to the basic service set identifier. The method includes determining, by the computing device for each of the plurality of networks, whether to attempt to connect to such network based at least in part on the comparison of the service set identifier to the basic service set identifier for such network.

15 Claims, 3 Drawing Sheets

SYSTEMS AND METHODS FOR ENHANCED NETWORK IDENTIFICATION

FIELD OF THE INVENTION

The present disclosure relates generally to systems and methods for enhanced identification of networks provided by appliances. More particularly, the present disclosure is directed to systems and methods for more quickly identifying networks hosted by appliances by comparing the service set identifier (SSID) of each network to the basic service set identifier (BSSID) for such network.

BACKGROUND OF THE INVENTION

Due to recent advancements in technology, home appliances are increasingly including "smart" features that are capable of performing intelligent or complex tasks in addition to their traditional functionality. One challenge presented by such advanced functionality, however, is to provide the advanced features without burdening the users with onerous interaction with the technology.

As an example, certain appliances can act as a WiFi Access Point or otherwise host a wireless network. In such fashion, the appliances can provide one or more computing devices (e.g. a smartphone, tablet, or home energy manager) with access to a local or wide area network (e.g. the Internet).

However, existing systems may require the operator of the computing device to manually identify the network hosted by the appliance. For example, the operator may be required to manually enter the network name or SSID. Manual entry of network information can be time consuming, tedious, and prone to error.

As another example, the operator may be required to select the network hosted by the appliance from a list or other device menu. However, interaction with various menus or other system controls of the computing device can be time consuming or challenging, particularly for a novice user.

In certain other systems, selection of a particular network may not be required. Instead, the computing device may simply sequentially attempt to join each and every available network until a successful connection is encountered. However, this process of "trial and error" can result in a lengthy waiting time for the user, particularly in densely populated areas where a large number of "incorrect" networks are available for attempted connection.

Further, using such process of trial and error, the computing device may inappropriately cease searching when it connects to an incorrect network. For example, if a neighbor has configured her home network to allow connection without a password, then the computing device may successfully connect to such network and incorrectly assume that the appropriate network has been joined.

Therefore, systems and methods for enhanced identification of networks provided by appliances are desirable. In particular, systems and methods that provide fast, reliable, and user-friendly identification of appliance-hosted networks are needed.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a method for speeding up network identification. The method includes receiving, by a computing device, identification data for each of a plurality of networks. The identification data for each of the plurality of networks includes a service set identifier and a basic service set identifier. At least one of the plurality of networks is hosted by an appliance. The method includes comparing, by the computing device for each of the plurality of networks, the service set identifier to the basic service set identifier. The method includes determining, by the computing device for each of the plurality of networks, whether to attempt to connect to such network based at least in part on the comparison of the service set identifier to the basic service set identifier for such network.

Another aspect of the present disclosure is directed to a method for speeding up network identification. The method includes obtaining, by a computing device, a service set identifier and a basic service set identifier for each of a plurality of networks. One or more of the plurality of networks is hosted by an appliance. The method includes determining, by the computing device for each of the plurality of networks, whether a first portion of the service set identifier matches a second portion of the basic service set identifier. The method includes ignoring, by the computing device, each of the plurality of networks for which it is determined that the first portion of the service set identifier does not match the second portion of the basic service set identifier. The method includes attempting, by the computing device, to connect to at least one of the plurality of networks for which it is determined that the first portion of the service set identifier matches the second portion of the basic service set identifier.

Another aspect of the present disclosure is directed to a system for providing enhanced network identification. The system includes a computing device configured to obtain a service set identifier and a basic service set identifier for each of a plurality of networks. The system includes an appliance configured to host one of the plurality of networks. The service set identifier of the network hosted by the appliance includes at least a portion of the basic service set identifier associated with the appliance. The computing device is configured to attempt to connect to one of the plurality of networks only if the service set identifier for such network includes at least a portion of the basic service set identifier for such network.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
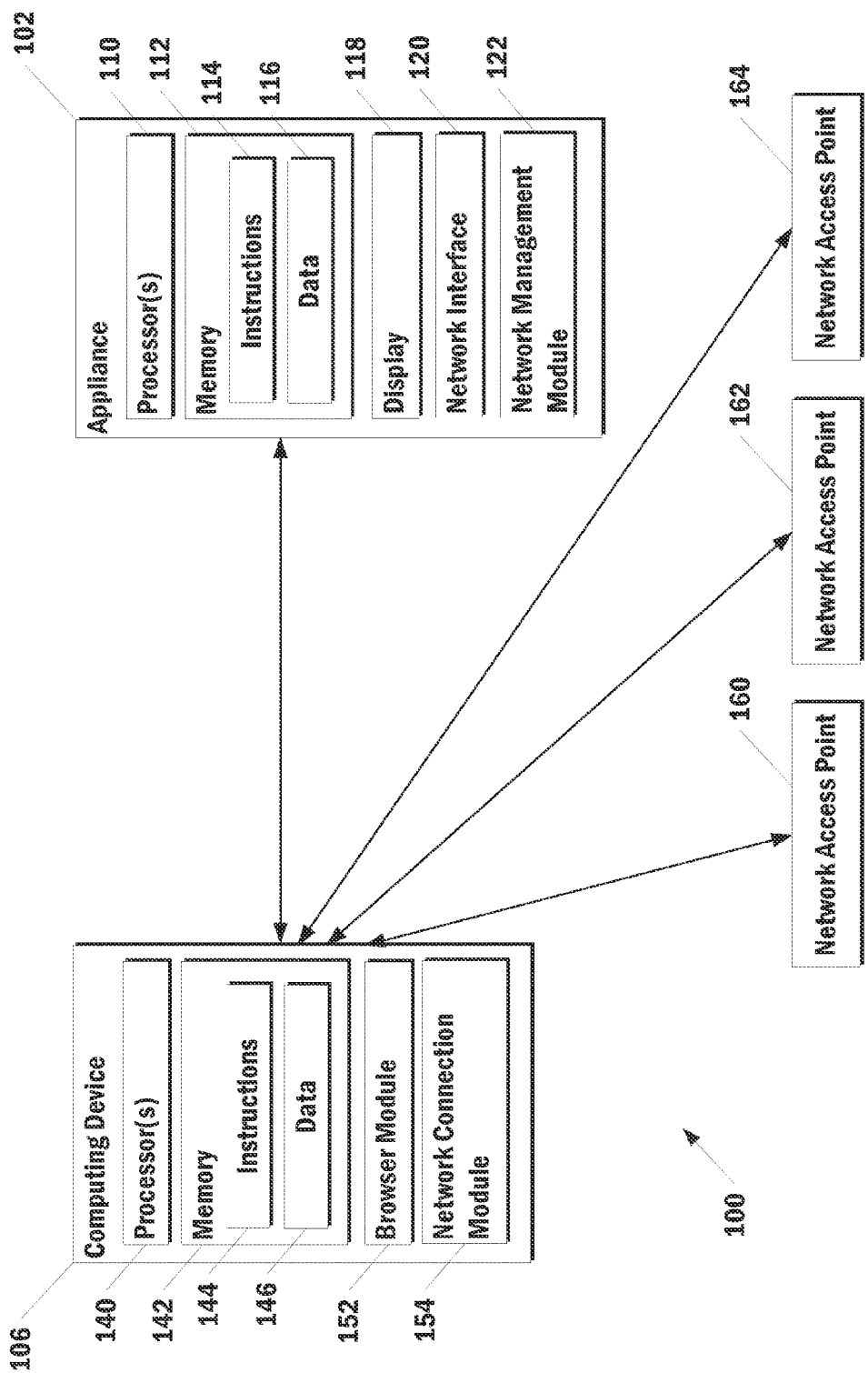
FIG. 1 depicts an exemplary system for enhanced network identification according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for enhanced identification of a network hosted by an appliance. In particular, as an example, an appliance capable of hosting a local area network can be configured to include at least a portion of the BSSID of the appliance within the SSID of the network hosted by such appliance. For example, if the BSSID of the appliance is D828C9000123, then the appliance can be configured to include the last four characters of the BSSID (e.g. 0123) within the SSID.

As another example, the appliance can also be configured to include a predetermined string of characters within the SSID. For example, the appliance can be configured to begin the SSID with the predetermined character string "GE." Thus, as an example, the SSID of the network hosted by the appliance can be "GE_0123."

According to another aspect of the present disclosure, an application or other module can be installed onto or included in a computing device. The module can be implemented by the computing device to quickly and easily find and connect to the network hosted by the appliance.

In particular, the module can analyze all available networks in light of the predefined patterns expected to be exhibited by the SSID of the network hosted by the appliance. Thus, the module can scan all available networks and only attempt to join the networks that satisfy such predetermined criteria.

As an example, the module may only attempt to join networks for which the SSID of the network includes at least a portion of the BSSID associated with such network. Thus, for example, if a network SSID does not include the last four digits of the BSSID, the module may ignore such network and move on to consider the next network.

As another example, the module may only attempt to join networks that include the predetermined string of characters within the SSID. Thus, for example, if a network does not begin with "GE," then the module may ignore such network and move on to consider the next network.

Once the appropriate network has been identified, then the module can connect the computing device to such network using a passcode received from a user. In such fashion, the user is not required to manually select or enter the network name or SSID. Further, the lengthy waiting time associated with a trial and error style connection process can be eliminated as the vast majority of networks will be ignored prior to an attempted connection.

Therefore, according to the present disclosure, various predetermined criteria can be used to generate an appliance network SSID so that it is quickly and easily identifiable from a significant number of available networks. In particular, various patterns or relationships exhibited between the BSSID and SSID of a network can be used and analyzed by a module attempting to connect a computing device to the appliance-hosted network.

With reference now to the FIGS., exemplary embodiments of the present disclosure will be discussed in further detail. FIG. 1 depicts an exemplary system 100 for enhanced network identification according to an exemplary embodiment of the present disclosure.

In particular, system 100 can include a computing device 106 to which various network connections are available. More particularly, an appliance 102 and a plurality of network access points 160, 162, and 164 can each host a network to which computing device 106 can attempt to connect.

Appliance 102 can be any suitable type of appliance, including, but not limited to, a dishwasher, a microwave, a washing machine, a dryer, an oven, a refrigerator, a heater, a home energy manager, or any other type of appliance.

Appliance 102 can include one or more processors 110, a memory 112, a display 118, and a network interface 120. The processor(s) 110 can be any suitable processing device, such as a microprocessor, microcontroller, integrated circuit, or other suitable processing device.

The memory 112 can include any suitable storage media, including, but not limited to, non-transitory computer-readable media, RAM, ROM, hard drives, flash drives, accessible databases, or other memory devices. The memory 112 can store information accessible by processor(s) 110, including instructions 114 that can be executed by processor(s) 110 to control various components of appliance 102 to provide appliance functionality. Memory 112 can also store various forms of other data 116.

Display 118 can be any display for displaying information from appliance 102 to a user. As examples, display 118 can be a liquid crystal display or an LED display.

According to an aspect of the present disclosure, appliance 102 can be capable of hosting a network. For example, network interface 120 can include suitable components for hosting one more networks. In particular, as an example, network interface 120 can include a wireless access point, a router, and/or a modem. As further examples, network interface 120 can include transmitters, receivers, ports, controllers, antennas, or other suitable components.

In addition, appliance 102 can include a network management module 122. Appliance 102 can implement network management module 122 to host and manage the wireless network.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

As an example, in some implementations, network management module 122 can be implemented to create and maintain the network hosted by appliance 102. For example, network management module 122 can generate and broadcast a service set identifier (SSID) and a basic service set identifier (BSSID) associated with the network. In some implementations, the BSSID can be the MAC address or the EUI48 of appliance 102. The BSSID can be stored in data 116 and accessed by network management module 122.

In some implementations, network management module 122 can actively generate the SSID of the network. For example, network management module 122 can retrieve the BSSID from data 116 and generate the SSID according to one or more predetermined criteria. However, in other implementations, the network SSID can be pre-assigned and stored in data 116.

As another example, network management module 122 can be implemented to manage network resources and connections. For example, network management module 122 can receive a request from computing device 106 to connect to the network. Network management module 122 can validate various credentials, such as, for example, a passcode provided by computing device 106 and allow the requested connection if the provided credentials satisfy the criteria.

The network hosted by appliance 102 can use one or more various protocols for exchanging data. For example, network management module 122 can be implemented to exchange data with computing device 106 using any of the IEEE 802.11 family of networking standards, Bluetooth, or any other suitable wireless protocols.

Computing device 106 can be, for example, a wireless mobile device, a personal digital assistant (PDA), smartphone, tablet, laptop computer, desktop computer, music player, computing-enabled watch, computing-enabled eyeglasses, gaming console, embedded computing system, home energy manager, smart meter, an additional appliance, or other such devices/systems.

Computing device 106 can include one or more processors 140 and a memory 142. The processor(s) 140 can be any suitable processing device, such as a microprocessor, microcontroller, integrated circuit, or other suitable processing device.

The memory 142 can include any suitable storage media, including, but not limited to, non-transitory computer-readable media, RAM, ROM, hard drives, flash drives, accessible databases, or other memory devices. The memory 142 can store information accessible by processor(s) 140, including instructions 144 that can be executed by processor(s) 140 to control various components of computing device 106 to implement the present disclosure. Memory 142 can also store various forms of other data 146.

Computing device 106 can also include a browser module 152. Browser module 152 can be implemented to operate a web browsing application.

Computing device 106 can include a network connection module 154. Computing device 106 can implement network connection module 154 to quickly and easily find and connect to the network hosted by appliance 102.

As an example, network connection module 154 can be implemented to analyze all available networks in light of one or more predefined patterns expected to be exhibited by the SSID of the network hosted by appliance 102. Thus, network connection module 154 can scan all available networks and only attempt to join the networks that satisfy such predetermined criteria.

Figure 2:
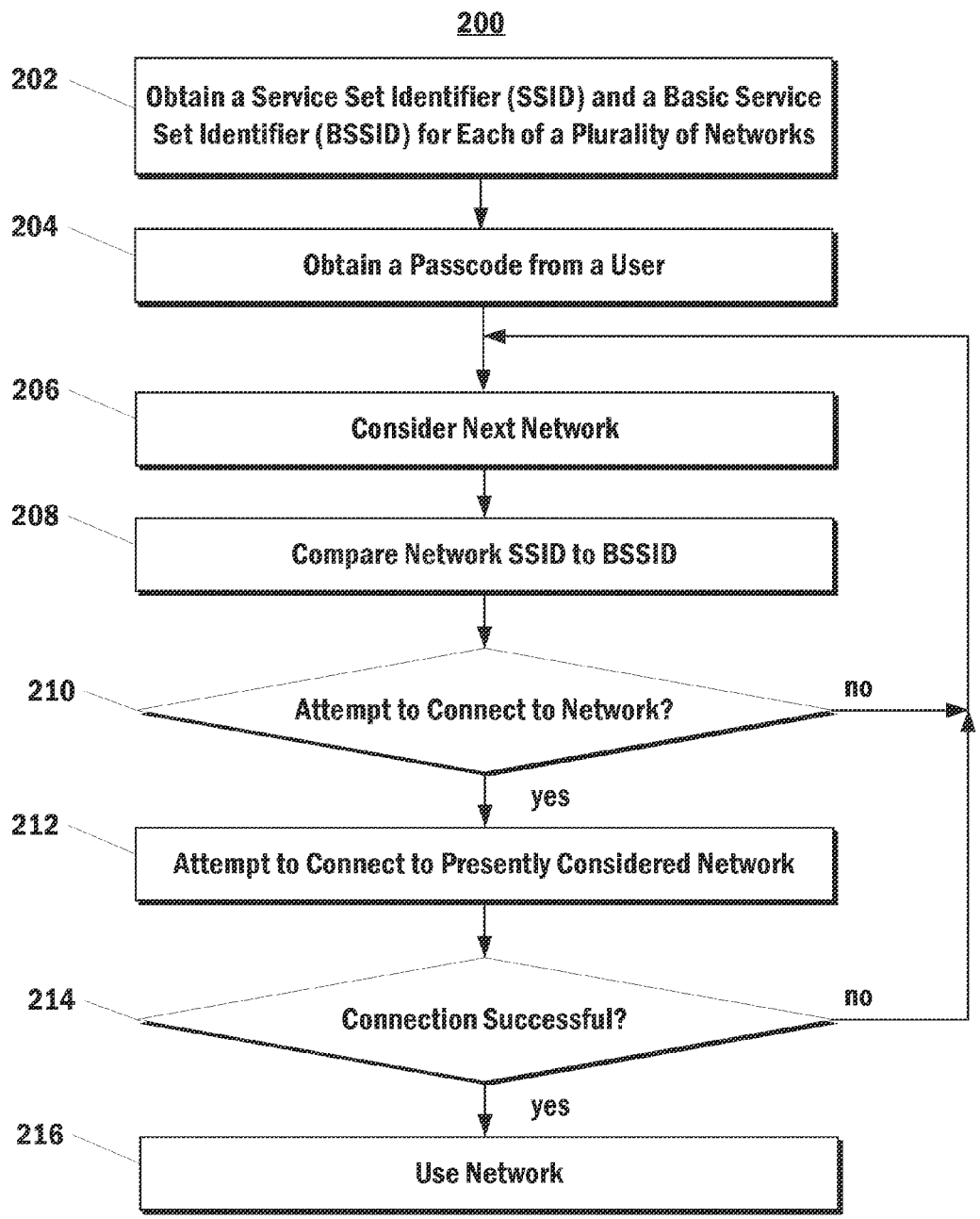
FIG. 2 depicts a flow chart of exemplary method for enhanced network identification according to an exemplary embodiment of the present disclosure.
Figure 3:
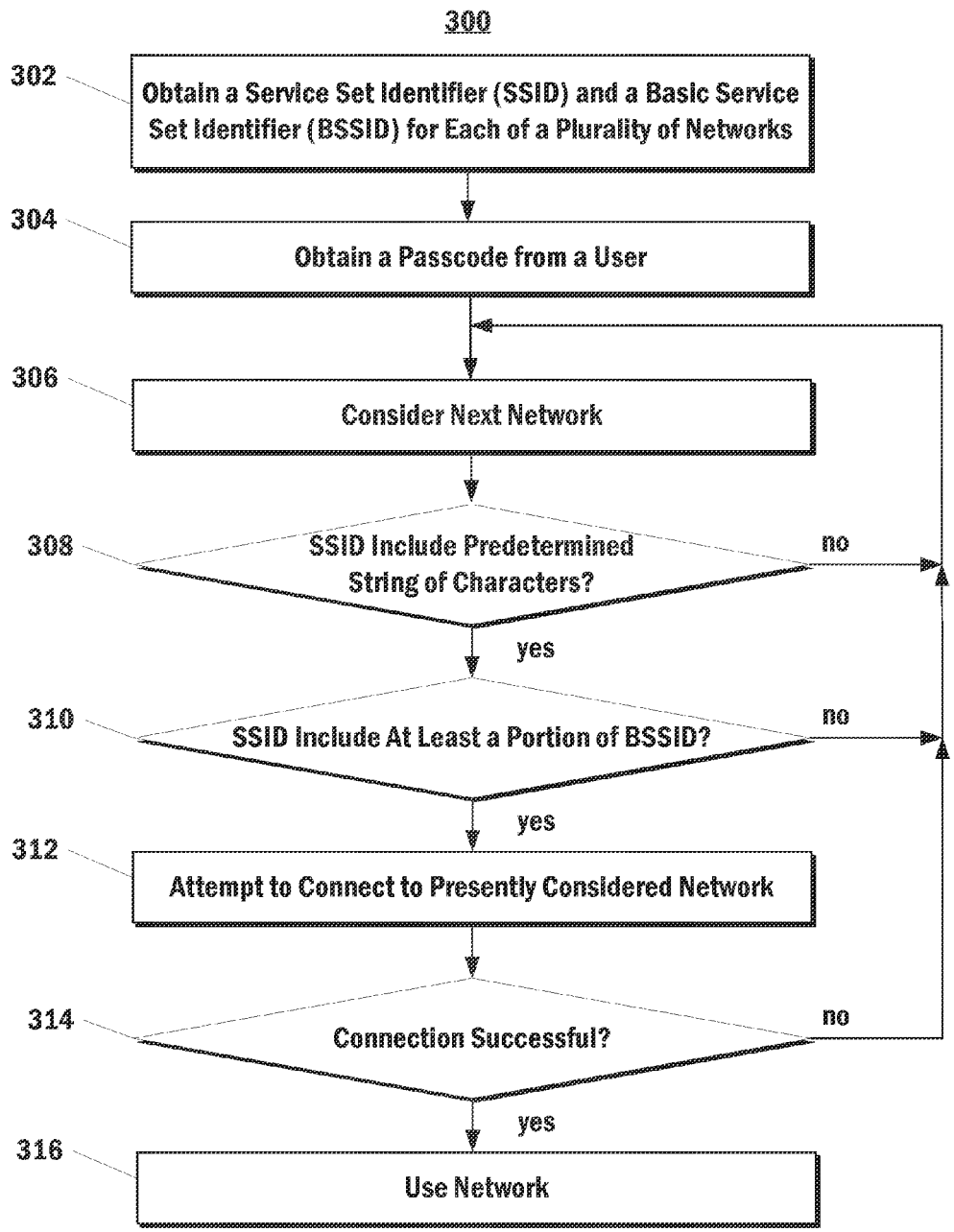
FIG. 3 depicts a flow chart of exemplary method for enhanced network identification according to an exemplary embodiment of the present disclosure.

In some implementations, network connection module 154 can be implemented to perform aspects of method (200) of FIG. 2 and method (300) of FIG. 3.

FIG. 2 depicts a flow chart of exemplary method (200) for enhanced network identification according to an exemplary embodiment of the present disclosure. Although method (200) will be discussed with reference to system 100 of FIG. 1, method (200) can be performed by any suitable system.

In addition, FIG. 2 depicts steps performed in a particular order for purposes of illustration and discussion. Those of ordinary skill in the art, using the disclosures provided herein, will understand that the various steps of method (200) can be omitted, adapted, and/or rearranged in various ways without departing from the scope of the present disclosure.

At (202) a service set identifier (SSID) and a basic service set identifier (BSSID) can be obtained for each of a plurality of networks. For example, each of appliance 102 and network access points 160, 162, and 164 can host a network and broadcast the SSID and BSSID associated with such network. Computing device 106 can receive the broadcasted SSID and BSSID for each network.

At (204) a passcode can be obtained from a user. For example, the passcode can be a string of characters or symbols that allows access to the network hosted by appliance 102. The user can input the passcode into computing device 106. In some implementations, a passcode is not necessarily used and therefore step (204) can be omitted.

At (206) the next network can be considered. In particular, each network that is available to computing device 106 for attempted connection can be sequentially considered. Thus, the networks can be organized according to any logic and then considered on an individual basis. As such, at the first instance of (206) a first particular network can be considered by computing device 106. Further, in some implementations, two or more networks can be individually considered using parallel computing operations.

At (208) the network SSID for the presently considered network can be compared to the BSSID for such network. For example, network connection module 154 can include instructions for identifying the presence or absence of one or more predetermined patterns to be exhibited by the SSID of a network with respect to the BSSID of such network. Thus, at (208) network connection module 154 can be implemented to compare the SSID for the presently considered network to the BSSID for such network to determine whether such patterns are exhibited.

As an example, at (208) it can be determined whether the SSID includes at least a portion of the BSSID. For example, it can be determined whether the SSID includes a first portion that matches a second portion of the BSSID. The second portion can have a predefined length and/or a predefined position within the BSSID. Likewise, the first portion can have a predefined length and/or predefined position within the SSID. In particular, in some implementations, at (208) it can be determined whether the SSID includes the last four characters of the BSSID.

At (210) it can be determined whether to attempt to connect to the presently considered network. As an example, if the comparison of the SSID to the BSSID at (208) revealed the presence of the one or more predetermined patterns, then at (210) it can be determined that an attempted connection to the presently considered network should be performed. Likewise, if the comparison of the SSID to the BSSID at (208) revealed the absence of the one or more predetermined patterns, then at (210) it can be determined that an attempted connection to the presently considered network should not be performed.

If it is determined at (210) that the computing device should not attempt to connect to the present considered network, then method (200) can return to (206) and consider the next network. In such fashion, computing device 106 can attempt to connect to only those networks that satisfy the predetermined criteria or patterns.

However, if it is determined at (210) that the computing device should attempt to connect to the present considered network, then method (200) can proceed to (212).

At (212) the computing device can attempt to connect to the presently considered network using the passcode obtained at (204). For example, network connection module 154 can communicate the received passcode to network management module 122. If the passcode is valid, then network management module 122 can allow or enable the connection of computing device 106 to the network hosted by appliance 102.

At (214) it can be determined whether the attempted connection at (212) has been successful. If it is determined at (214) that the computing device has not successfully connected to the network, then method (200) can return to (206) and consider the next network.

However, if it is determined at (214) that the computing device has successfully connected to the network, then method (200) can proceed to (216).

At (216) the computing device can use the network to perform various operations. For example, a user can operate computing device 106 to control appliance 102 over the network or to modify one or more settings of appliance 102 over the network. Generally, however, use of the network at (216) does not require any specific actions or interactions.

FIG. 3 depicts a flow chart of exemplary method (300) for enhanced network identification according to an exemplary embodiment of the present disclosure. Although method (300) will be discussed with reference to system 100 of FIG. 1, method (300) can be performed by any suitable appliance system.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

At (302) a service set identifier (SSID) and a basic service set identifier (BSSID) can be obtained for each of a plurality of networks. For example, each of appliance 102 and network access points 160, 162, and 164 can host a network and broadcast the SSID and BSSID associated with such network. Computing device 106 can receive the broadcasted SSID and BSSID for each network.

At (304) a passcode can be obtained from a user. For example, the passcode can be a string of characters or symbols that allows access to the network hosted by appliance 102. The user can input the passcode into computing device 106. In some implementations, a passcode is not necessarily used and therefore step (304) can be omitted.

At (306) the next network can be considered. In particular, each network that is available to computing device 106 for attempted connection can be sequentially considered. Thus, the networks can be organized according to any logic and then considered on an individual basis. As such, at the first instance of (306) a first particular network can be considered by computing device 106. Further, in some implementations, two or more networks can be individually considered using parallel computing operations.

At (308) it can be determined whether the SSID includes a predetermined string of characters. For example, appliance 102 can be configured to begin the SSID of its hosted network with the predetermined character string "GE."

If it is determined at (308) that the SSID of the presently considered network does not include the predetermined string of characters, then method (300) can return to (306) and consider the next network. Thus, for example, if a network does not begin with "GE," then network connection module 154 may ignore such network and move on to consider the next network.

However, if it is determined at (308) that the SSID of the presently considered network does include the predetermined string of characters, then method (300) can proceed to (310).

At (310) it can be determined whether the SSID of the presently considered network includes at least a portion of the BSSID of such network. For example, it can be determined whether the SSID includes a first portion that matches a second portion of the BSSID. The second portion can have a predefined length and/or a predefined position within the BSSID. Likewise, the first portion can have a predefined length and/or predefined position within the SSID. In particular, in some implementations, at (310) it can be determined whether the SSID includes the last four characters of the BSSID.

If it is determined at (310) that the SSID of the presently considered network does not include at least a portion of the BSSID, then method (300) can return to (306) and consider the next network. Thus, if a network SSID does include at least a portion of the BSSID, then network connection module 154 may ignore such network and move on to consider the next network.

However, if it is determined at (310) that the SSID of the presently considered network does include at least a portion of the BSSID, then method (300) can proceed to (312).

At (312) the computing device can attempt to connect to the presently considered network using the passcode obtained at (304). For example, network connection module 154 can communicate the received passcode to network management module 122. If the passcode is valid, then network management module 122 can allow or enable the connection of computing device 106 to the network hosted by appliance 102.

At (314) it can be determined whether the attempted connection at (312) has been successful. If it is determined at (314) that the computing device has not successfully connected to the network, then method (300) can return to (306) and consider the next network.

However, if it is determined at (314) that the computing device has successfully connected to the network, then method (300) can proceed to (316).

At (316) the computing device can use the network to perform various operations. For example, a user can operate computing device 106 to control appliance 102 over the network or to modify one or more settings of appliance 102 over the network. Generally, however, use of the network at (316) does not require any specific actions or interactions.

The technology discussed herein references servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computing processes discussed herein may be implemented using a single computing device or multiple computing devices working in combination. Databases and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for speeding up network identification, the method comprising:
   generating, by an appliance, a first service set identifier for a first network hosted by the appliance, wherein at least a first portion of the generated first service set identifier matches at least a second portion of a first basic service set identifier associated with the appliance;
   receiving, by a computing device, identification data for each of a plurality of networks, wherein the identification data for each of the plurality of networks comprises a service set identifier and a basic service set identifier for such network, and wherein the first network is included in the plurality of networks;
   comparing, by the computing device for each of the plurality of networks, the service set identifier for such network to the basic service set identifier for such network, wherein comparing, by the computing device for each of the plurality of networks, the service set identifier for such network to the basic service set identifier for such network comprises determining, by the computing device for each of the plurality of networks, whether a first string of characters included in the service set identifier for such network matches a second string of characters in the basic service set identifier for such network; and
   determining, by the computing device for each of the plurality of networks, whether to attempt to connect to such network based at least in part on the comparison of the service set identifier for such network to the basic service set identifier for such network, wherein determining, by the computing device for each of the plurality of networks, whether to attempt to connect to such network based at least in part on the comparison of the service set identifier for such network to the basic service set identifier for such network comprises:
      ignoring, by the computing device, each of the plurality of networks for which it is determined that the first string of characters included in the service set identifier for such network does not match the second string of characters included in the basic service set identifier for such network; and
      attempting, by the computing device, to connect to at least one of the plurality of networks for which it is determined that the first string of characters included in the service set identifier for such network matches the second string of characters included in the basic service set identifier for such network.

2. The method of claim 1, wherein:
   the first string of characters has a predetermined length.

3. The method of claim 2, wherein:
   the second string of characters has a predetermined length and a predetermined position within the basic service set identifier.

4. The method of claim 3, wherein the second string of characters comprises the last four characters included in the basic service set identifier.

5. The method of claim 4, wherein the first string of characters comprises the last four characters included in the service set identifier.

6. The method of claim 1, further comprising:
   determining, by the computing device for each of the plurality of networks, whether the service set identifier for such network includes a predetermined string of characters;
   wherein determining, by the computing device for each of the plurality of networks, whether to attempt to connect to such network based at least in part on the comparison of the service set identifier to the basic service set identifier for such network comprises determining, by the computing device for each of the plurality of networks, whether to attempt to connect to such network based at least in part on the comparison of the service set identifier to the basic service set identifier for such network and based at least in part on whether the service set identifier for such network includes the predetermined string of characters.

7. The method of claim 6, wherein:
   determining, by the computing device for each of the plurality of networks, whether the service set identifier for such network includes the predetermined string of characters comprises determining, by the computing device for each of the plurality of networks, whether a predetermined number of characters at the beginning of the service set identifier matches the predetermined string of characters.

8. A method for speeding up network identification, the method comprising:
   generating, by an appliance, a first service set identifier for a first network hosted by the appliance, wherein at least a first portion of the generated first service set identifier matches at least a second portion of a first basic service set identifier associated with the appliance;
   hosting, by the appliance, the first network with the first service set identifier;
   obtaining, by a computing device, a service set identifier and a basic service set identifier for each of a plurality of networks, wherein the plurality of networks comprise the first network hosted by an appliance;
   determining, by the computing device for each of the plurality of networks, whether a first string of characters included in the service set identifier for such network matches a second string of characters included in the basic service set identifier for such network;
   ignoring, by the computing device, each of the plurality of networks for which it is determined that the first string of characters included in the service set identifier for such network does not match the second string of characters included in the basic service set identifier for such network; and
   attempting, by the computing device, to connect to at least one of the plurality of networks for which it is determined that the first string of characters included in the service set identifier for such network matches the second string of characters included in the basic service set identifier for such network.

9. The method of claim 8, further comprising:
receiving, by the computing devices, a passcode from a user;
wherein attempting, by the computing device, to connect to at least one of the plurality of networks comprises attempting, by the computing devices to connect to the at least one of the plurality of networks using the passcode.

10. The method of claim 8, wherein the second portion of the first basic service set identifier comprises a predetermined number of characters at a predetermined position within the first basic service set of identifier.

11. The method of claim 8, wherein:
the basic service set identifier for each network comprises a sequence of characters; and
the second string of characters included in the basic service set identifier comprises the last four characters in the sequence.

12. A system for providing enhanced network identification, the system comprising:
an appliance configured to:
generate a first service set identifier for a first network hosted by the appliance based at least in part on a first basic service set identifier associated with the appliance, wherein at least a first portion of the generated first service set identifier matches at least a second portion of the first basic service set identifier; and
host the first network with the first service set identifier; and
a computing device configured to:
obtain a service set identifier and a basic service set identifier for each of a plurality of networks; and
attempt to connect to one of the plurality of networks only if the service set identifier for such network includes a first string of characters that matches a second string of characters included in the basic service set identifier for such network.

13. The system of claim 12, wherein the second string of characters included in the basic service set identifier comprises a predetermined number of characters positioned at the end of the basic service set identifier.

14. The system of claim 12, wherein the computing device is configured to attempt to connect to one of the plurality of networks only if the service set identifier for such network includes the first string of characters that matches the second string of characters included in the basic service set identifier for such network and also the service set identifier for such network includes a predetermined string of characters.

15. The system of claim 12, wherein the computing device is configured to attempt to connect to one of the plurality of networks only if the service set identifier for such network includes the first string of characters that matches the second string of characters included in the basic service set identifier for such network and also the service set identifier for such network begins with a predetermined string of characters.

* * * * *